US008552992B1

(12) United States Patent
 Kim et al.

(10) Patent No.: US 8,552,992 B1
(45) Date of Patent: Oct. 8, 2013

(54) SYSTEMS AND METHODS FOR TEXTUAL INPUT USING MULTI-DIRECTIONAL INPUT DEVICES

(75) Inventors: John T. Kim, La Canada, CA (US); Robert Wai-Chi Chu, Oakland, CA (US); Steven Ka Cheung Moy, San Francisco, CA (US); Laurent An Minh Nguyen, Los Altos, CA (US)

(73) Assignee: Amazon Technologies, Inc., Reno, NV (US)

(*) Notice: Subject to any disclaimer, the term of this patent is extended or adjusted under 35 U.S.C. 154(b) by 1017 days.

(21) Appl. No.: 12/164,669

(22) Filed: Jun. 30, 2008

(51) Int. Cl.
*G06F 17/21* (2006.01)
*G06F 3/041* (2006.01)
*G06F 3/048* (2013.01)

(52) U.S. Cl.
USPC ............................ 345/173; 715/256; 715/831

(58) Field of Classification Search
USPC ............................ 345/156, 173; 715/256, 831
See application file for complete search history.

(56) References Cited

U.S. PATENT DOCUMENTS

| 5,952,942 | A | 9/1999 | Balakrishnan et al. |
| 5,959,629 | A * | 9/1999 | Masui ............................ 715/808 |
| 7,323,959 | B2 * | 1/2008 | Naka et al. ..................... 335/205 |
| 2004/0066405 | A1 * | 4/2004 | Wessler et al. ................. 345/764 |
| 2004/0225502 | A1 * | 11/2004 | Bear et al. ...................... 704/270 |
| 2005/0052406 | A1 * | 3/2005 | Stephanick et al. ........... 345/156 |
| 2007/0273648 | A1 * | 11/2007 | Fussinger ..................... 345/161 |
| 2008/0195973 | A1 * | 8/2008 | Shimkin ........................ 715/817 |
| 2008/0218523 | A1 * | 9/2008 | Zuverink ....................... 345/473 |
| 2009/0009367 | A1 * | 1/2009 | Hirshberg ........................ 341/22 |
| 2009/0183098 | A1 * | 7/2009 | Casparian et al. ............. 715/765 |
| 2010/0156837 | A1 * | 6/2010 | Maw ............................ 345/173 |
| 2011/0161200 | A1 * | 6/2011 | Carmona et al. ............. 705/27.1 |

* cited by examiner

*Primary Examiner* — Amr Awad
*Assistant Examiner* — Randal Willis
(74) *Attorney, Agent, or Firm* — Lee & Hayes, PLLC

(57) ABSTRACT

A method is disclosed for specifying textual input for a computing device using a multi-directional input device. Each character of a textual group is associated with a different angle. Each character of the textual group is displayed on a display screen at the associated angle. A swipe angle of a directional swipe received at a multi-directional pointing device is determined. The associated angle closest to the swipe angle is identified. The character of the textual group corresponding to the identified angle on the display screen is highlighted.

25 Claims, 18 Drawing Sheets

SYSTEMS AND METHODS FOR TEXTUAL INPUT USING MULTI-DIRECTIONAL INPUT DEVICES

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Electronic technologies, such as computer technologies, relating to reducing the size and increasing the complexity of electronics have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. As such, benefits may be realized from improved systems and methods for interacting with an electronic device.

DETAILED DESCRIPTION

Figure 1:
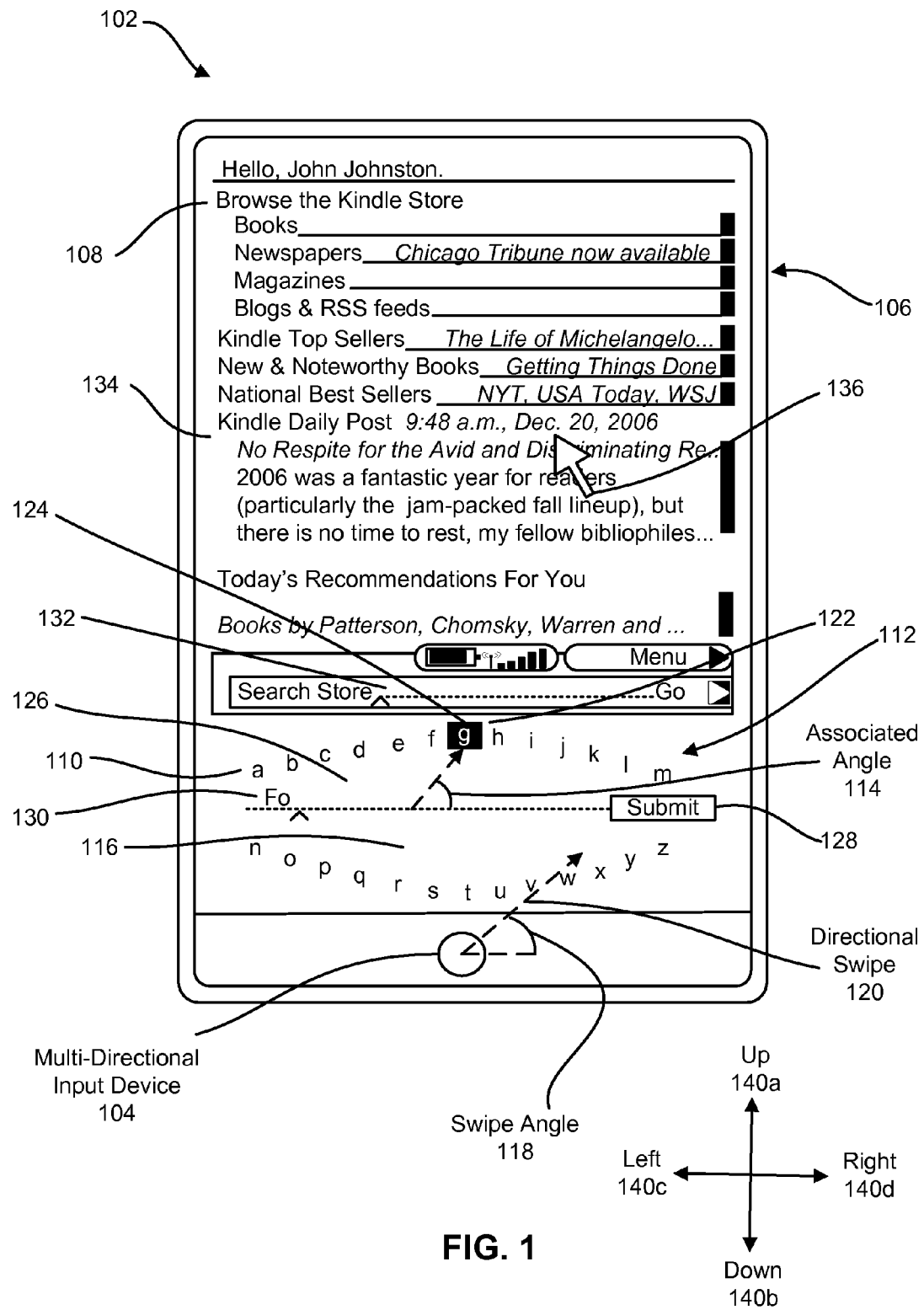
FIG. 1 illustrates one embodiment of a system for specifying textual input for a computing device utilizing a multi-directional input device.

A method for specifying textual input for a computing device using a multi-directional input device is disclosed. The method includes associating each character of a textual group with a different angle. Each character of the textual group is displayed on a display screen at the associated angle. A swipe angle of a directional swipe received at a multi-directional pointing device (such as a track ball or 5-way input device) is determined. The associated angle closest to the swipe angle is identified. The character of the textual group corresponding to the identified angle on the display screen is highlighted.

In one embodiment, highlighting the character of the textual group comprises displaying visual indicia on the display screen to distinguish the highlighted character from other characters. In another embodiment, highlighting the character of the textual group comprises displaying the highlighted character in a text submission area on the display screen.

Also, a swipe magnitude of the directional swipe received at the multi-directional pointing device may be determined with highlighting comprising highlighting the character of the textual group corresponding to the identified angle and the swipe magnitude.

The characters of the textual group may include letters of an alphabet, numbers, symbols, or one or more of the foregoing. The display screen may include a text submission area. The characters may be displayed in positions both above and below the text submission area on the display screen. Also, entered characters may be sent to a computer program in response to activation of a submit button.

An apparatus for specifying textual input using a multi-directional input device is also disclosed. The apparatus includes a processor, a multi-directional input device in electronic communication with the processor, a display screen in electronic communication with the processor, and memory in electronic communication with the processor. Instructions are stored in the memory and are executable to cause the apparatus to specify textual input using a multi-directional input device. Each character of a textual group is associated with a different angle. Each character of the textual group is displayed on the display screen at the associated angle. A swipe angle of a directional swipe received at the multi-directional pointing device is determined. The associated angle closest to the swipe angle is identified. The character of the textual group corresponding to the identified angle on the display screen is highlighted.

A computer-readable medium comprising instructions executable to specify textual input for computing device using a multi-directional input device is also disclosed. Each character of a textual group is associated with a different angle. Each character of the textual group is displayed on a display screen at the associated angle. A swipe angle of a directional swipe received at a multi-directional pointing device is determined. The associated angle closest to the swipe angle is identified. The character of the textual group corresponding to the identified angle on the display screen is highlighted.

FIG. 1 is a block diagram illustrating one embodiment of a system 102 that accepts textual input using a multi-directional input device 104. The system 102 uses a computing device. This system 102 may be used in connection with a number of different types of computing devices including, for example, an eBook reading device 106 (as illustrated in FIG. 1), a portable phone, a tablet PC, a personal data assistant (PDA), a desktop computer, or laptop computer.

As indicated above, the computing device 106 may include a multi-directional input device 104. A multi-directional input device 104 is any device that may receive user input specifying a particular direction or angle. In the embodiment shown in FIG. 1, the multi-directional input device 104 is a trackball 104, although other types of multi-directional input devices may be used, such as a mouse or 5-way input device (an input device with four directional buttons and a select button). A keyboard is not considered to be a multi-directional input device 104. A trackball 104 enables a user to specify a particular direction. More specifically, by rolling or moving the trackball 104 in a particular direction, or angle, a direction may be specified by a user. Utilizing a multi-directional input device 104 to specify a particular direction or angle (whether by rolling or moving a trackball 104 or pressing a directional button) will be referred to as a "directional swipe" in this application.

In one embodiment, the trackball 104 may be pressed toward the eBook reader 106 to select a highlighted or specified item, similar to a mouse click. Alternatively, the trackball 104 may include a physically discrete button (not shown) that may be used to select a highlighted or specified item. Pressing the trackball 104, a select button (such as for 5-way input device), or a separate button (not shown) for a trackball 104 to select or identify a specified item shown on a display screen 108 will be referred to as "clicking" or a "click" in this application.

In the illustrated embodiment, each character 110 of a textual group 112 is associated with a different angle 114. Characters 110 within a textual group 112 may comprise a specific group of letters 110 of an alphabet, numbers, and/or symbols (such as punctuation or mathematical symbols—a period, backslash, dash, underscore, etc.). Each character 110 of the textual group 112 is displayed on the display screen 108 at the associated angle 114 relative to an area 116. The disclosed systems 102 and methods may also be used with characters 110 from other alphabets, besides the English alphabet, which is shown only for illustrative purposes in FIG. 1.

When the device 106 is in a text entry mode (which will be explained below), a swipe angle 118 of a directional swipe 120 may be received at the multi-directional input device 104. The associated angle 114 closest to the swipe angle 118 is identified. The character 110 corresponding to the identified angle 114 is highlighted on the display screen 108.

Highlighting may include displaying visual indicia 122 on the display screen to distinguish the specified character 124 from other displayed characters 110, such as bolding by the character 124 or placing a dark block 122 around and inverting the color of the character 124 (as shown in FIG. 1). In one such embodiment, when an identified character 124 is highlighted and the trackball 104 is clicked, the highlighted character 124 is sent to the text submission area 126. Alternatively, highlighting may comprise placing the character 124 identified by the directional swipe 120 in the text submission area 126.

When the desired characters 130 are positioned in the text submission area 126, the submit button 128 may be activated to send the characters 130 in the text submission area 126 to a specified area 132 of another computer program or programs 134. Activation of the submit button 128 may occur, for example, by inputting a directional swipe 120 on the trackball 104 to the right 140d (i.e., in the direction of the submit button 128 relative to the area 116) or by other directional swipes 120, combinations of directional swipes 120, or activation of other hardware or software buttons, controls, or icons.

As indicated above, the device 106 may employ a text entry mode. In one embodiment, when the device 106 is not in the text entry mode, directional swipes 120 move a mouse pointer 136 in the direction specified by input received through the multi-directional input device 104. In contrast, once the device 106 has entered the text entry mode, directional swipes 120 will be interpreted as textual input, as explained above.

The text entry mode may be entered, for example, by clicking the text submission area 126 (if it is visible) or by activating a particular software or hardware button, control, or icon (not shown) on the device 106. The device 106, in contrast, may exit the text entry mode in response to activating the submit button 128, or in response to input received by a specific hardware or software button, control, or icon (also not shown) on the device 106. In one embodiment, activating the submit button 128 sends text in the text submission area 126 into another computer program 134 and also exits the text entry mode.

In another embodiment, the textual group 112 may be divided into two or more groups such that a directional swipe 120 may first select the sub-group. For example, letters "a" through "g" may be in one sub-group, "h" through "m" may be in another sub-group, "n" through "t" may be in another sub-group, and "u" through "z" may be in the last sub-group. Once the sub-group is selected, it may be expanded on the display screen 108, and a second directional swipe 120 may be used to select the character 110 from that sub-group. In this embodiment, the swipe angle 118 to select a specific character 110 (the second directional swipe 120) may not need to be as precise as if the textual group had not been divided into sub-groups.

Figure 2:
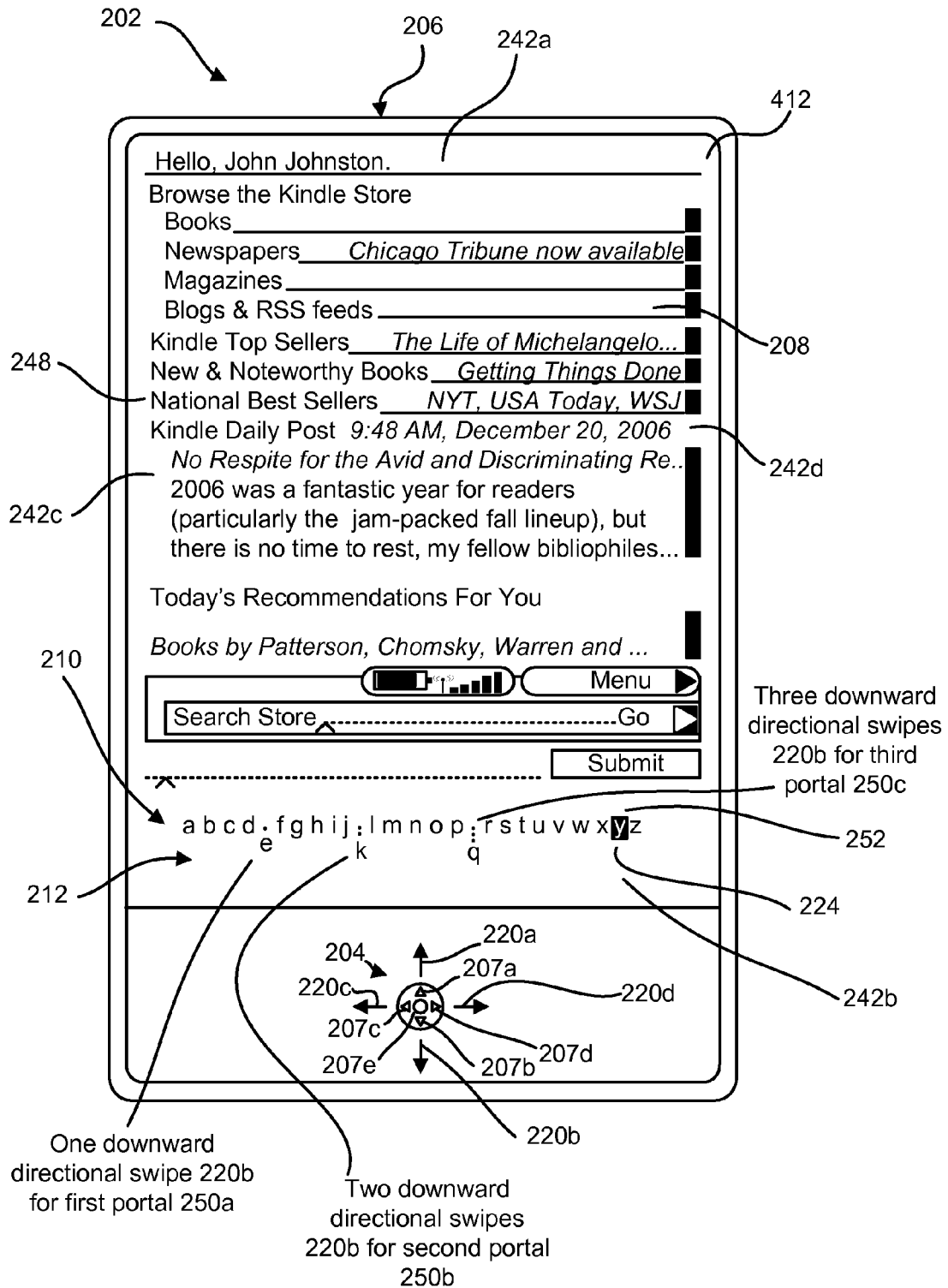
FIG. 2 illustrates another embodiment of a system for specifying textual import utilizing a multi-directional input device employing portals.

FIG. 2 illustrates another embodiment of a system 202 for inputting text, or specifying textual input, utilizing a multi-directional input device 204. As in the embodiment of FIG. 1, a computing device, such as an eBook reader 206, is used.

In FIG. 2, the multi-directional input device 204 is a five-way input device 204. The five-way input device 204 includes an up, down, left, right, and select button 207a-e. The up button 207a is oriented to indicate movement toward an upper portion 242a of the display screen 208, the down button 207b is oriented to indicate movement toward a lower portion 242b of the display screen 208, and the left button 207c is oriented to indicate movement towards a left portion 242c of the display screen 208, and the right button 207d is oriented to indicate movement towards a right portion 242d of the display screen 208 when the device 106 is positioned such that text 248 on the display screen 208 is upright and readable. The five buttons 207a-e shown in FIG. 2 may be arranged in other ways, such as including five separate buttons 207a-e positioned in a linear configuration. Also, buttons or controls for other directions may be used, such as buttons for eight different directions. In addition, in this embodiment, the multi-directional input device 204 may be a trackball 104 (shown in FIG. 1). The trackball 104 may be used to input upward, downward, leftward, and rightward directional swipes 220a-d, and also directional swipes 220a-d at other intermediary directions.

In the embodiment shown in FIG. 2, characters 210 of a textual group 212 are shown on the display screen 208. The characters 210 may be displayed in a single row (as shown in FIG. 2) or, alternatively, could be displayed in multiple rows or columns, or in a circular or other arrangement. At periodic intervals, certain characters 210 are identified as "portals" 250a-c. A portal 250a-c is a character 210 to which the highlighted region 252 may be quickly moved using a particular sequence of directional swipes 220.

As illustrated in FIG. 2, the letters "e," "k," and "q" are designated as portals 250a-c. In one embodiment, the highlighted region 252 may be moved to the first portal 250a, the letter "e," from a current highlighted character 224 using single downward directional swipe 220b (pressing the downward button 207b). The highlighted region 252 may be moved to the second portal 250b, the letter "k," by inputting two downward directional swipes 220b in rapid succession, or to the third portal 250c, the letter "q," inputting three downward directional swipes 220b in rapid succession. Alternative input, such as the use of different directional swipes 220, combinations of directional swipes 220, or other user input, may be used to move to the portals 250a-c within the scope the disclosed systems 202 and methods.

These portals 250a-c enable a user to quickly move to remote characters 210 without repeatedly inputting leftward or rightward directional swipes 220c-d (pressing the left button 207c or a right button 207d repeatedly) on the multi-directional input device 204. The portals 250a-c may remain at static positions on the characters 210 or may change position, such as 5, 10, and 15 characters 210 away from the highlighted character 224. Of course, the number of portals 250a-c may be varied within the scope of the disclosed systems 204 and methods.

Figure 3:
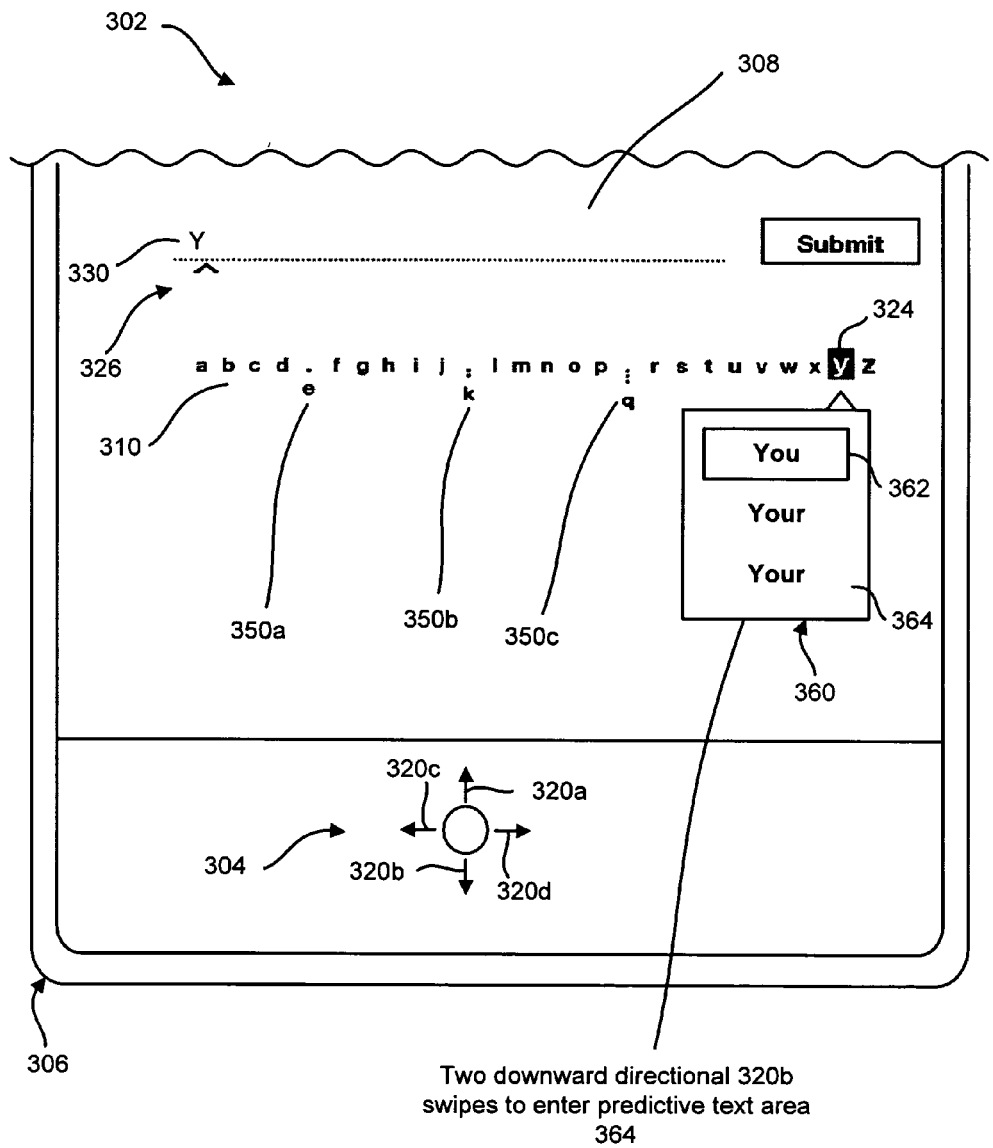
FIG. 3 illustrates one embodiment of the system of FIG. 2 further including the use of predictive text.

FIG. 3 illustrates another embodiment of a system 302 for specifying textual input utilizing a multi-directional input device 304. As indicated above, a multi-directional input device 304 may include, for example, a trackball 104 (as shown in FIG. 1) or a five-way input device 204 (illustrated in FIG. 2). For simplicity, only a portion of a device 306 is shown in FIG. 3 (as is also the case in FIGS. 4-13, which are discussed below).

The embodiment of FIG. 3, like the embodiment of FIG. 2, uses portals 350a-c to enable a user to quickly move to specified characters 310. However, in this embodiment, once a particular character 330 has been input into the text submission area 326 or has been highlighted 324, predictive text 360 is displayed on the screen 308. Predictive text 360 includes entries 362, which comprise likely words or phrases based on letters/words previously input into the text submission area 326 and/or highlighted characters 324.

In one embodiment, when the predictive text 360 is displayed, a downward directional swipe 320b, or another specified directional swipe 320, button, control or icon, highlights an entry 362 within the predictive text area 364. Once an entry 362 within the predictive text area 364 has been highlighted, upward and downward directional swipes 320a-b may be utilized to navigate between the displayed entries 362 in certain embodiments of the disclosed systems 302 and methods.

Figure 4:
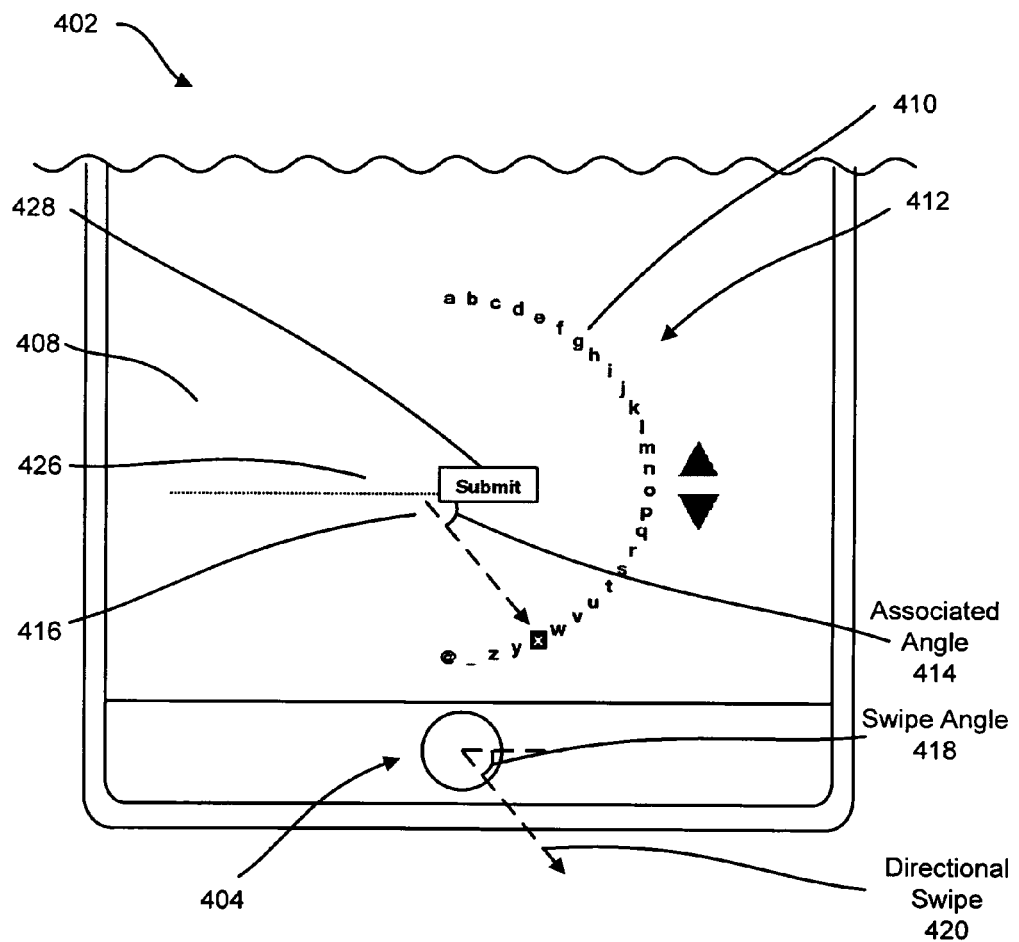
FIG. 4 illustrates one embodiment of a system for specifying textual input for a computing device utilizing characters arranged in a semi-circular configuration.

FIG. 4 is a block diagram illustrating another embodiment of a system 402 providing for textual input utilizing a multi-directional input device 404. This embodiment is similar to the embodiment shown in FIG. 1. Each character 410 of a textual group 412 is associated with a different angle 414. The characters 410 are shown on the display screen 408 at the associated angle 414 relative to an area 416. When a directional swipe 420 is received at the multi-directional input device 404, the swipe angle 418 of the directional swipe 420 is determined. The associated angle 414 closest to swipe angle 418 is identified. Thereafter, the character 410 corresponding to the identified angle 414 on the display screen 408 is highlighted.

The characters 410 shown in FIG. 4 are arranged in a semicircular configuration. Other configurations, such as positioning the entire semicircular group of characters 410 (or other linear or nonlinear configurations) below or above a text submission area 426, may also be utilized within the scope of the disclosed systems 402 and methods.

As with the system 102 of FIG. 1, a text entry mode may be utilized which may be entered and exited in various ways with the system 402 of FIG. 4. Also, as the embodiment shown in FIG. 1, the submit button 428 may be activated in various ways to send the text in the text submission area 426 to a computer program.

Figure 5:
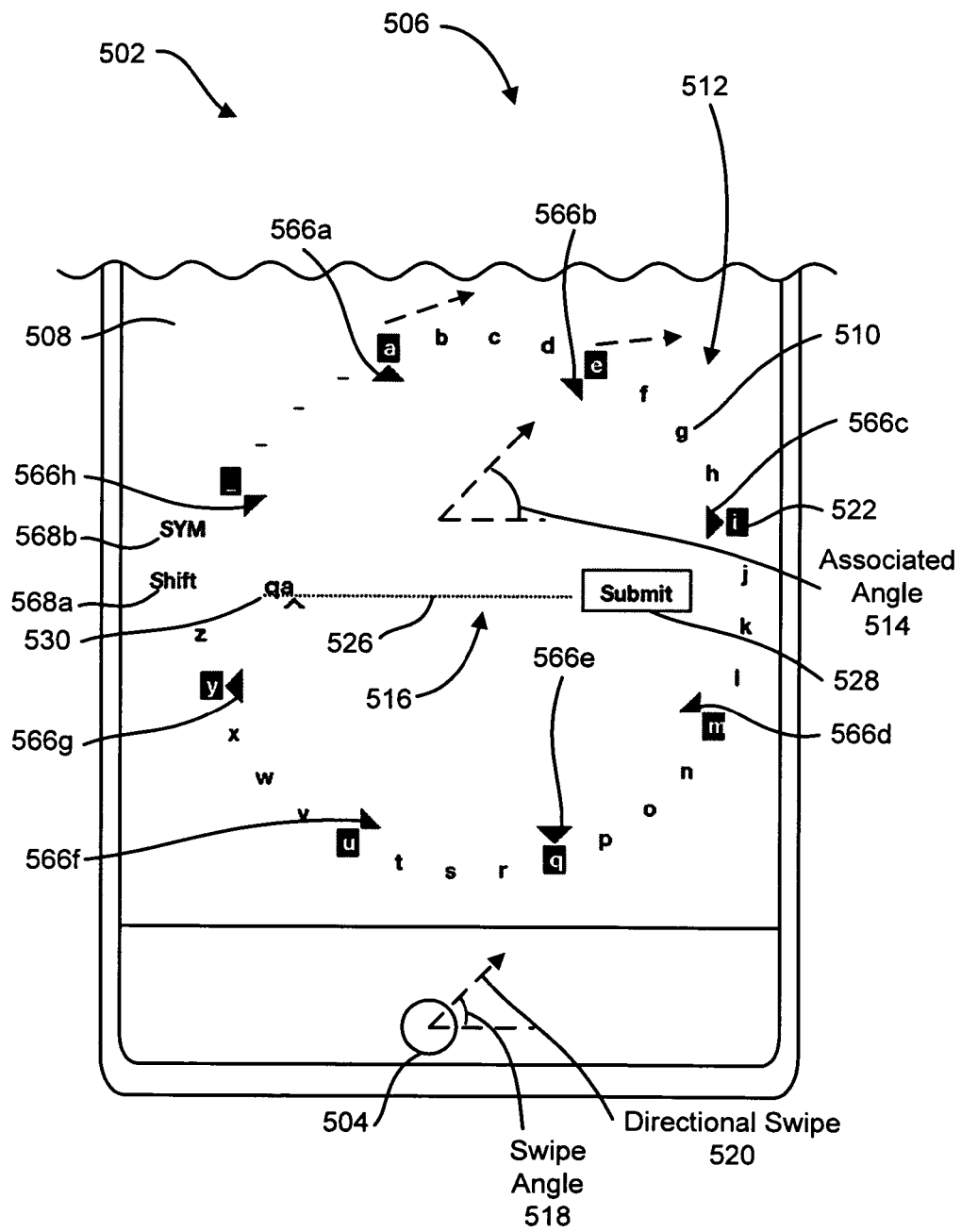
FIG. 5 illustrates another embodiment of a system for specifying textual input utilizing specified positions relative to an area.

FIG. 5 illustrates another embodiment of a system 502 providing for textual input using a multi-directional input device 504 for a device 506. In this embodiment, specified positions 566a-h, which are displayed utilizing an exemplary method of arrows, are associated with a particular angle 514. In one embodiment, characters 510 rotate through each of the specified positions 566a-h at periodic intervals, such as every second or every two seconds. In another embodiment, the specified positions 566a-h rotate relative to the characters 510. In either case, a specified position 566a-h is associated with a particular angle 514. In this embodiment, characters 510 of a textual group 512 comprise not only letters, numbers, or symbols, but may also include control indicators 568a-b, such as a "Shift" control indicator 568a or "Sym" control indicator 568b for displaying a menu or list of symbols.

A swipe angle 518 of a directional swipe 520 received at the multi-directional input device 504 is determined. The associated angle 514 closest to the swipe angle 518 is identified. The character 510 corresponding to the identified angle 514 on the display screen 508 at the time the directional swipe 520 was input is highlighted. Again, highlighting may comprise visual indicia 522 identifying a character 510 or placing the identified character 530 in text submission area 526. In other words, in one embodiment, a directional swipe 520 will cause the identified character 530 to be placed in the text submission area 526. In an alternative embodiment, a directional swipe 520 will cause the character 530 to be identified with visual indicia 522 after which the identified character 530 may be input into the text submission area 526, for example, by a click. As with other embodiments, a text entry mode and a submit button 528 may be utilized.

Figure 6A:
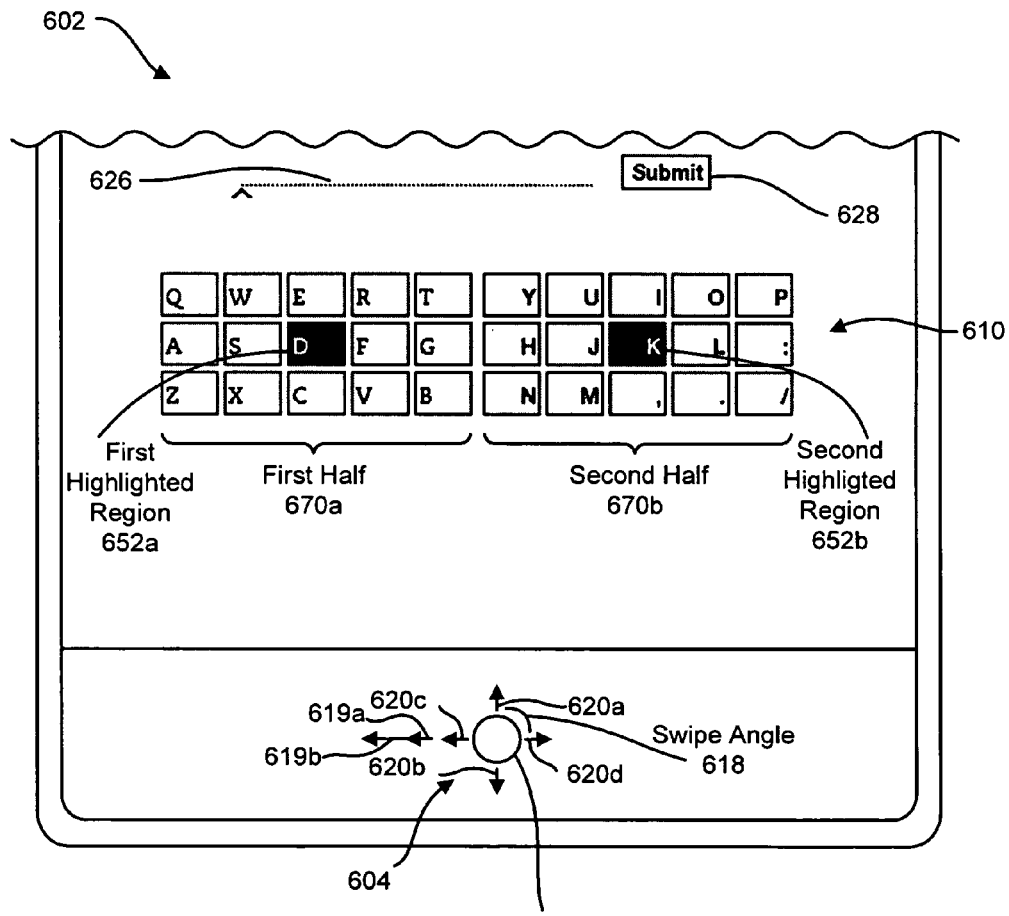
FIG. 6a illustrates one embodiment of a system for specifying textual input for a computing device using a first and a second highlighted region with a multi-directional input device.

FIG. 6a illustrates another embodiment of a system 602 providing for textual input utilizing a multi-directional input device 604. In the illustrated system 602, characters 610 are laid out in a series of rows and columns. The rows and columns are divided into a first half 670a and a second half 670b. A highlighted region 652a-b is positioned within each of the halves 670a-b, respectively. Both of the highlighted regions 652a-b move simultaneously in the same direction in response to a directional swipe 620a-d at the multi-directional input device 604. For example, a leftward directional swipe 620c would move the first highlighted region 652a to the "S" character and the second highlighted region 652b to the "J" character and so on.

In one embodiment, a swipe magnitude 619*a-b* is also determined. The swipe magnitude 619*a-b* could include a long swipe magnitude 619*b* (e.g., rolling the trackball a long distance, pressing a directional button of a 5-way input device multiple times in the same direction, or holding down a directional button on a 5-way input device) or a short swipe 619*a* (rolling the trackball a short distance, etc.), or various intermediary magnitudes. For example, a leftward directional swipe 620*c* of a long swipe magnitude 619*b* would move the first highlighted region 652*a* to the "A" character and of a short swipe magnitude 619*b* to the "S" character and so on. Thus, swipe magnitude 619*a-b* may be used in conjunction with a directional swipe 620*a-d* to identify a corresponding character 610. It should also be noted that swipe magnitude 619*a-b* may be used to identify a corresponding character 610 in connection with other embodiments disclosed herein such that a directional swipe 620*a-d* of a short swipe magnitude 619*a* may identify a closer character 610 in one direction while a directional swipe 620*a-d* of a long swipe magnitude 619*b* may identify a more remote character 610 in the same or generally the same direction. Thus, a character 610 corresponding to an angle 618 and magnitude 619*a-b* of a directional swipe 620*a-d* may be highlighted.

In one embodiment, a single click of the multi-directional input device 604 sends the character 610 identified by the first highlighted region 652*a* into the text submission area 626, and two clicks in rapid successions of the multi-directional input device 604 would cause the character 610 identified by the second highlighted region 652*b* to be input into the text submission area 626. Different directional inputs 620 or specified hardware or software buttons or icons may be used to input characters 610 identified by the first and second highlighted regions 652*a-b* within the scope of the disclosed systems and methods.

Utilizing this system, a highlighted region 652*a-b* does not need to move as far (minimizing input time) because use of a first and a second highlighted region 652*a-b* places these regions 652*a-b* in closer proximity to a desired displayed character 610. The system 602 of this embodiment, as other disclosed embodiments, may include a text entry mode and a submit button 628 for sending the selected characters to a computer program.

Figure 6B:
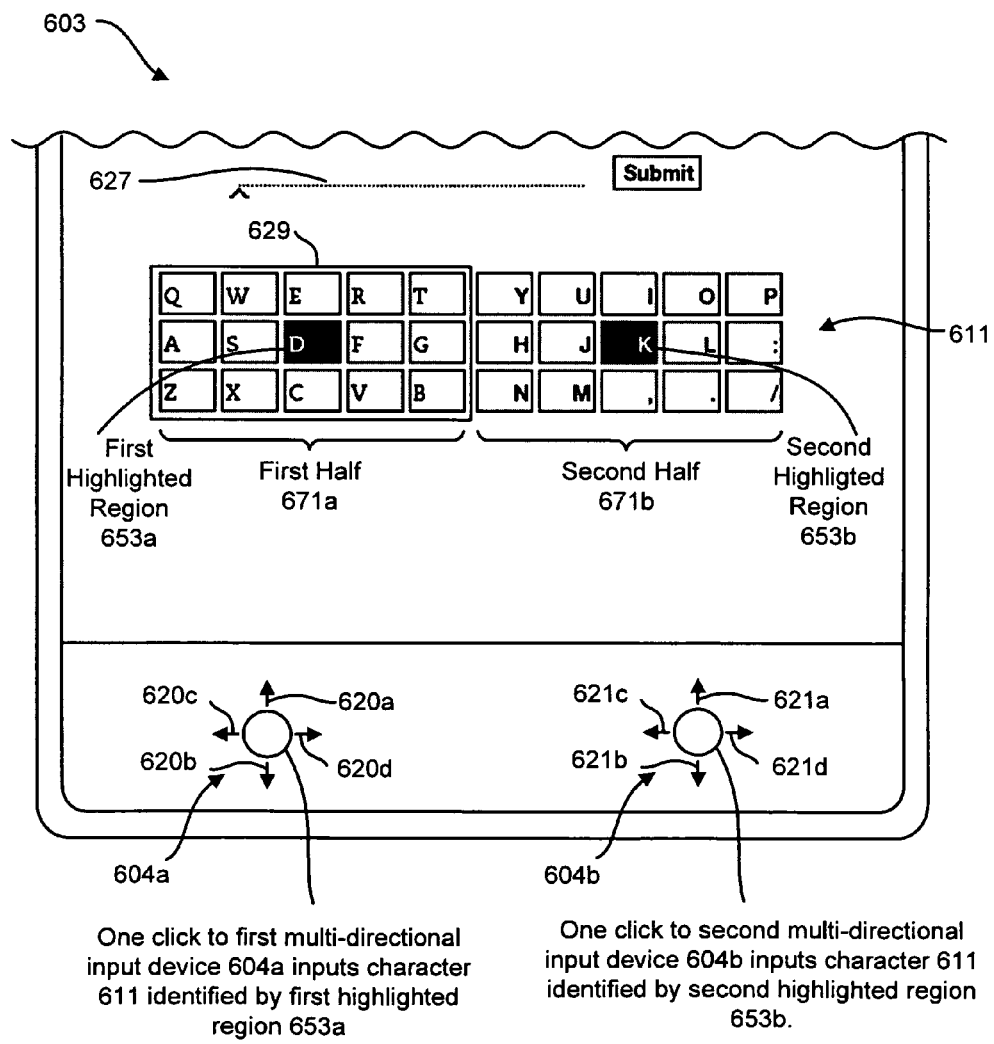
FIG. 6b illustrates one embodiment of a system for specifying textual input for a computing device using a first and a second highlighted region with at least two multi-directional input devices.

FIG. 6*b* illustrates an embodiment of a system 603 providing for textual input utilizing two or more multi-directional input devices 604*a-b*. As with the embodiment of FIG. 6*a*, characters 611 in FIG. 6*b* are laid out in a series of rows and columns. The rows and columns are divided into a first half and a second half 671*a-b*. A highlighted region 653*a-b* is also positioned within each one of the halves 671*a-b*, respectively. In this embodiment, one of the multi-directional input devices 604*a-b* may control which half 653*a-b* of the displayed characters 611 is active and the other of the multi-directional input devices 604*a-b* simultaneously moves the first highlighted region 653*a* and the second highlighted region 653*b* within the first and the second halves 671*a-b* of the displayed characters, respectively. For example, in one embodiment, the first multi-directional input device 604*a* controls which half 671*a-b* of the displayed characters is active such that leftward directional input 620*c* would activate the first half 671*a* when the second half 671*b* was previously active and vice versa. A rightward directional input 620*d* would activate the second half 671*b* when the first half 671*a* was previously active. In such an embodiment, the first and second highlighted regions 653*a-b* would simultaneously move in response to directional input 621*a-d* received at the second multi-directional input device 604*b*.

In another embodiment, a first highlighted region 653*a* moves in response to directional input 620*a-d* received at a first multi-directional input device 604*a*, and a second highlighted region 653*b* moves in response to directional input 621*a-d* received at a second multi-directional input device 604*b*. A single click on the first multi-directional input device 604*a* inputs the character 611 highlighted by the first highlighted region 653*a* into the text submission area 627. A single click to the second multi-directional input device 604*b* inputs the character 611 highlighted by the second highlighted region 653*b* into the text submission area 627. In one embodiment, visual indicia 629, such as a box, may indicate which half 671*a-b* of the displayed characters 611 is currently active, i.e., which half of the displayed characters 611 is ready to receive, is currently receiving, or most recently received input specifying a character 611.

Figure 7:
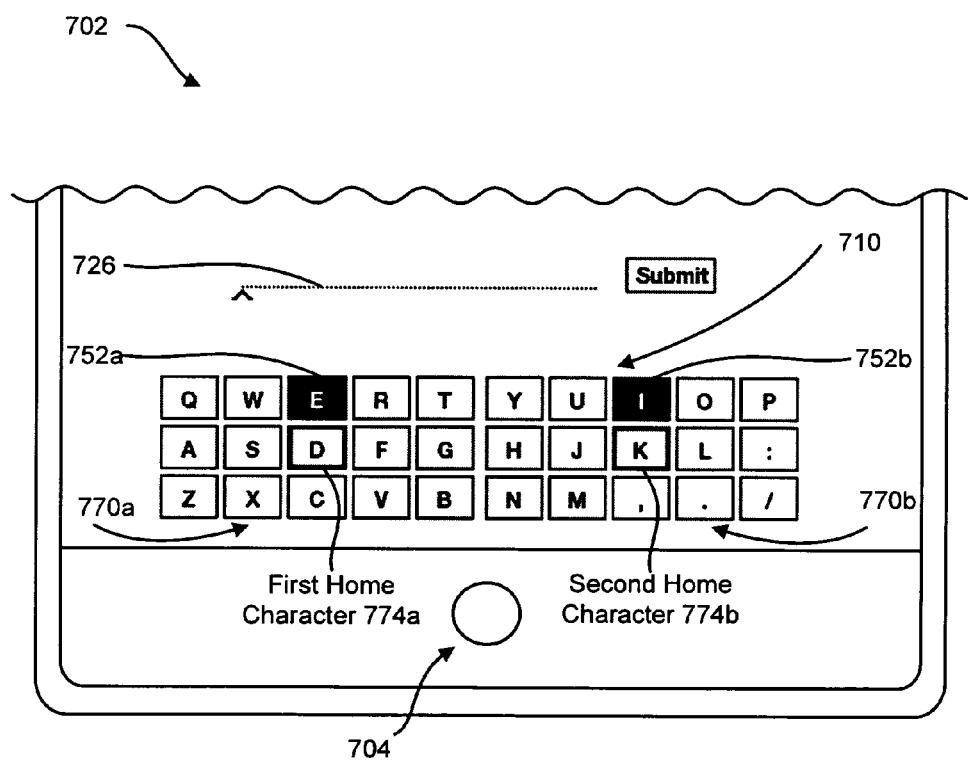
FIG. 7 illustrates an embodiment of a system of FIG. 6a further including home keys.

FIG. 7 is one embodiment of a system 702 similar to the embodiment shown in FIG. 6*a*. As with the embodiment shown in FIG. 6*a*, the system 702 shown in FIG. 7 includes a first and a second highlighted region 752*a-b*, each of which move within a first and a second half 770*a-b* of the displayed characters 710, respectively.

However, in this system 702, home characters 774*a-b* are specified. Following input of a particular character 710 to the text submission area 726, the highlighted regions 752*a-b* are returned to the home characters 774*a-b*, which in the figure are the "D" and the "K" displayed characters.

Figure 8:
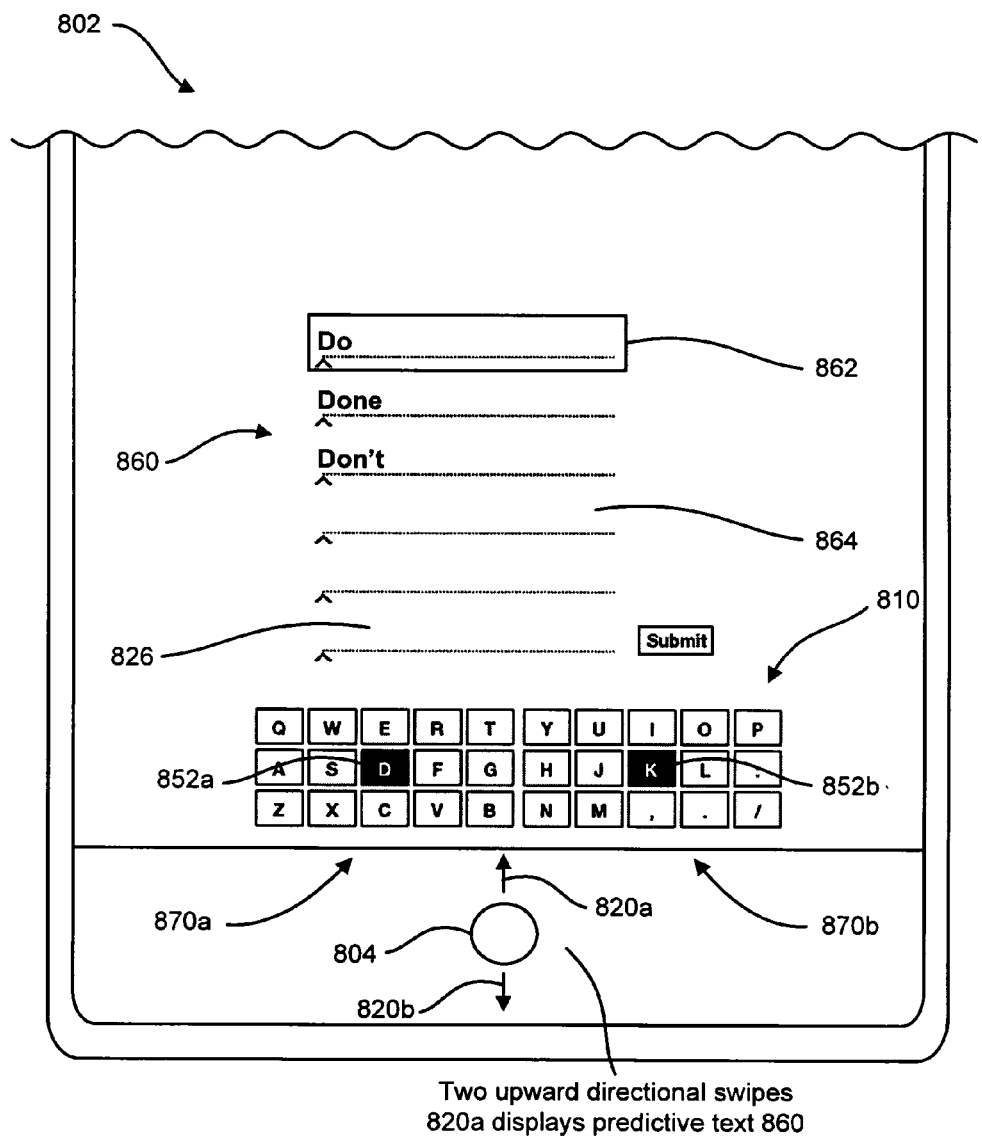
FIG. 8 illustrates an embodiment of a system shown in FIG. 6a further including predictive text.

With reference to FIG. 8, another embodiment of a system 802 for providing for textual input utilizing a multi-directional device 804 is provided. This embodiment, like the embodiments shown in FIGS. 6 and 7, includes a first and a second half 870*a-b* of the displayed characters 810 with two highlighted regions 852*a-b*. The highlighted regions 852*a-b* may move within each of the halves 870*a-b*, respectively.

In this embodiment, however, predictive text 860 is also displayed. An entry 862 within predictive text area 864 may be highlighted by inputting a series of directional swipes 820*a-b* or by activating a software or hardware button, control, or icon, such as by inputting two upward directional swipes 820*a* in rapid succession. Other entries 862 may be highlighted using, for example, upward or downward swipes 820*a-b* of the multi-directional input device 804. Clicking the multi-directional input device 804 sends the entry 862 that is highlighted to the text submission area 826.

Figure 9:
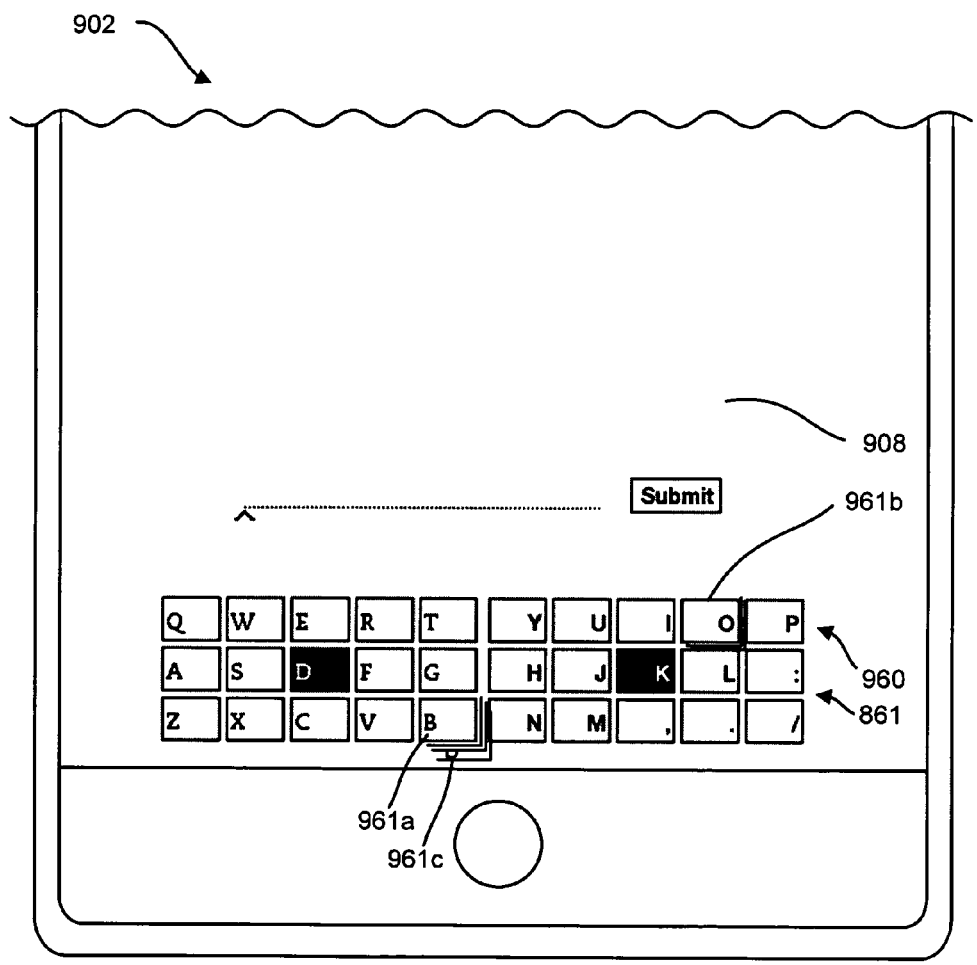
FIG. 9 illustrates one embodiment of the system of FIG. 6a further including predictive text illustrated by providing a visual representation of elevated text.

FIG. 9 illustrates one embodiment of a system 902 similar to the system 802 shown in FIG. 8. In this system 902, however, the predictive text 960 is shown by simulation of elevation of characters on the display screen 908 with the character first 961*a* in this sequence of the predictive text illustrated by the highest simulated height, followed by the next character 961*b* having the next highest simulated height and so on through the length of the predicted word or phrase. The predictive text 960 illustrated in FIG. 9 is the word "BOB."

If a single character 961*a* appears more than once in the predictive text 960 (such as the letter "B" in the word "BOB"), in the illustrated embodiment, that character 961*a* may be shown at different simulated heights with iterations of the character 961*c* of lower simulated heights being partially obscured and offset relative to the iteration of character 961*a* of the highest simulated height.

Figure 10:
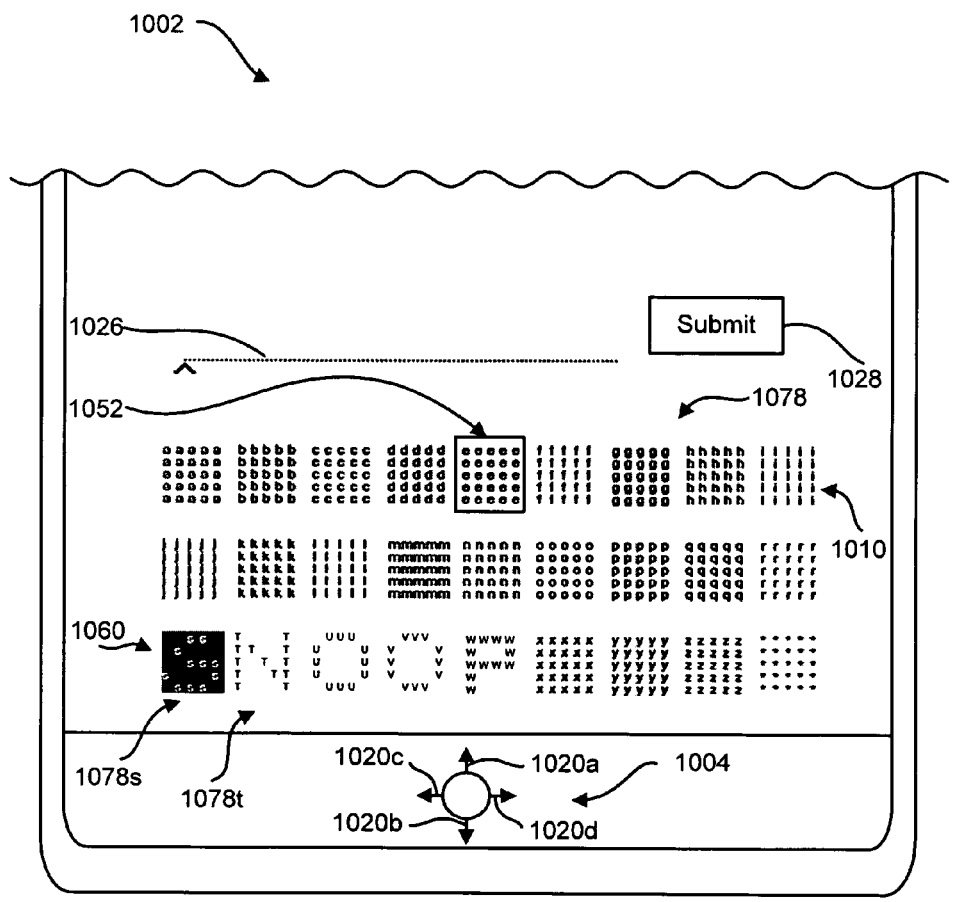
FIG. 10 illustrates another embodiment of a system for specifying textual input with predictive text displayed using matrices of characters.

FIG. 10 illustrates another embodiment of a system 1002 providing for textual input utilizing a multi-directional input device 1004. The disclosed embodiment includes a series of matrices 1078 for each displayed character 1010. Each matrix 1078 includes rows and columns of the same character 1010. A highlighted region 1052 may be moved from one matrix 1078 to another in response to directional swipes 1020*a-d* received at the directional input device 1004. When the highlighted region 1052 identifies a particular matrix 1078 of characters 1010, the character 1010 within the highlighted matrix 1052 is selected by clicking of the multi-directional input device 1004.

Predictive text 1060 may be displayed utilizing the matrices 1078 by arranging the characters 1010 within each matrix 1078 into the shape of a pertinent predictive character 1010. For example, as shown in FIG. 10, the predictive text comprises the word "SNOOP" with the matrix 1078*s* for the letter "S" being formed in the shape of an S, the matrix 1078*t* for the letter "T" being formed in the shape of an "N" and so forth.

The predictive text 1060 may be shown within an individual row of the matrices 1078 or may extend over multiple rows. The displayed predictive text 1060 may be sent to the text submission area 1026 using one or more directional swipes 1020*a-d* or specified hardware or software buttons, controls or icons. The system 1002 disclosed in FIG. 10, as well as the other systems and methods disclosed in this application, may include a text entry mode and a submit button 1028.

Figure 11:
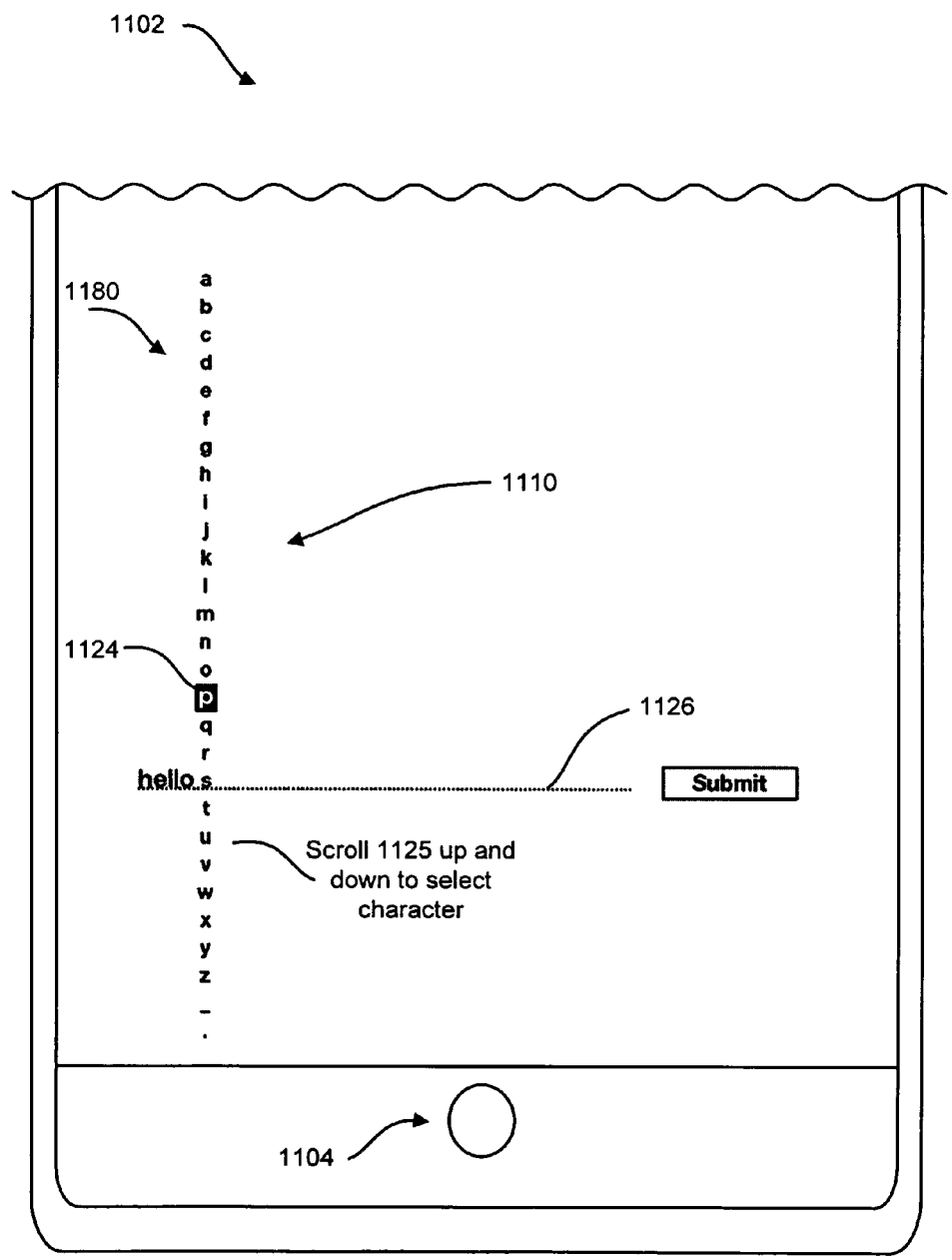
FIG. 11 is another embodiment of a system for specifying textual input utilizing a vertical arrangement of characters.

FIG. 11 illustrates yet another embodiment of a system 1102 for inputting text utilizing a multi-directional input device 1104. In this embodiment, a series of characters 1110 are displayed in a vertical arrangement 1180 at a point in a text submission area 1126 where the next character 1110 is to be input. A user may scroll 1125 up and down the vertical arrangement of characters 1110 utilizing a multi-directional input device 1104. Once again, clicking the multi-directional input device 1104 sends the highlighted character 1124 to the text submission area 1126.

Figure 12:
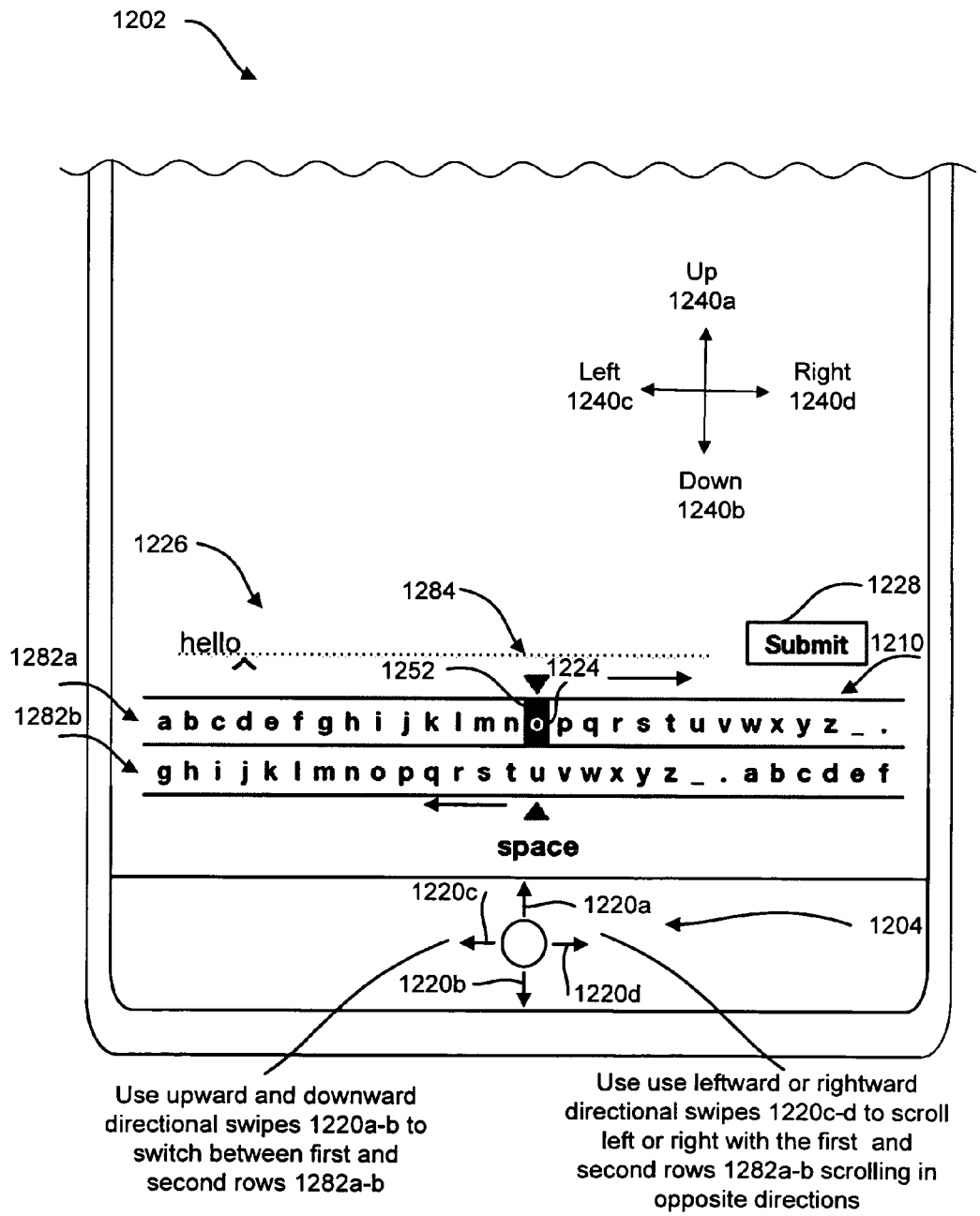
FIG. 12 illustrates another embodiment of a system for specifying textual input utilizing two rows of characters that scroll in opposite directions.

FIG. 12 is another embodiment of a system 1202 for inputting text utilizing a multi-directional input device 1204. The system 1202 includes two rows 1282*a-b* of characters 1210. The two rows 1282*a-b* of characters 1210 are offset relative to one another and, in one embodiment, are offset by half or about half the number of characters 1210 in each row 1282*a-b*. The two rows 1282*a-b* shown in FIG. 12 include the same set of characters 1210, although both rows 1282*a-b* do not necessarily have to include the same characters 1210. The system 1202 also includes a specified column 1284.

In response to leftward or rightward directional swipes 1220*c-d*, characters 1210 within the rows 1282*a-b* scroll in opposite directions. For example, in one embodiment, in response to leftward directional swipes 1220*c* the top row 1282*a* scrolls to the left 1240*c*, and the bottom row 1282*b* scrolls to the right 1240*d*.

Also, in one embodiment, a highlighted region 1252 within the specified column 1284 may be moved from the top row 1282*a* to the bottom row 1282*b* in response to downward directional swipes 1220*b*. Conversely, the highlighted region 1252 also may be moved from the bottom row 1282*b* to the top row 1282*a* in response to upward directional swipes 1220*a*. The highlighted character 1224 may be placed in the text submission area 1226 in response to, for example, clicking the multi-directional input device 1204. As with other embodiments, a text entry mode and a submit button 1228 may be employed.

Figure 13:
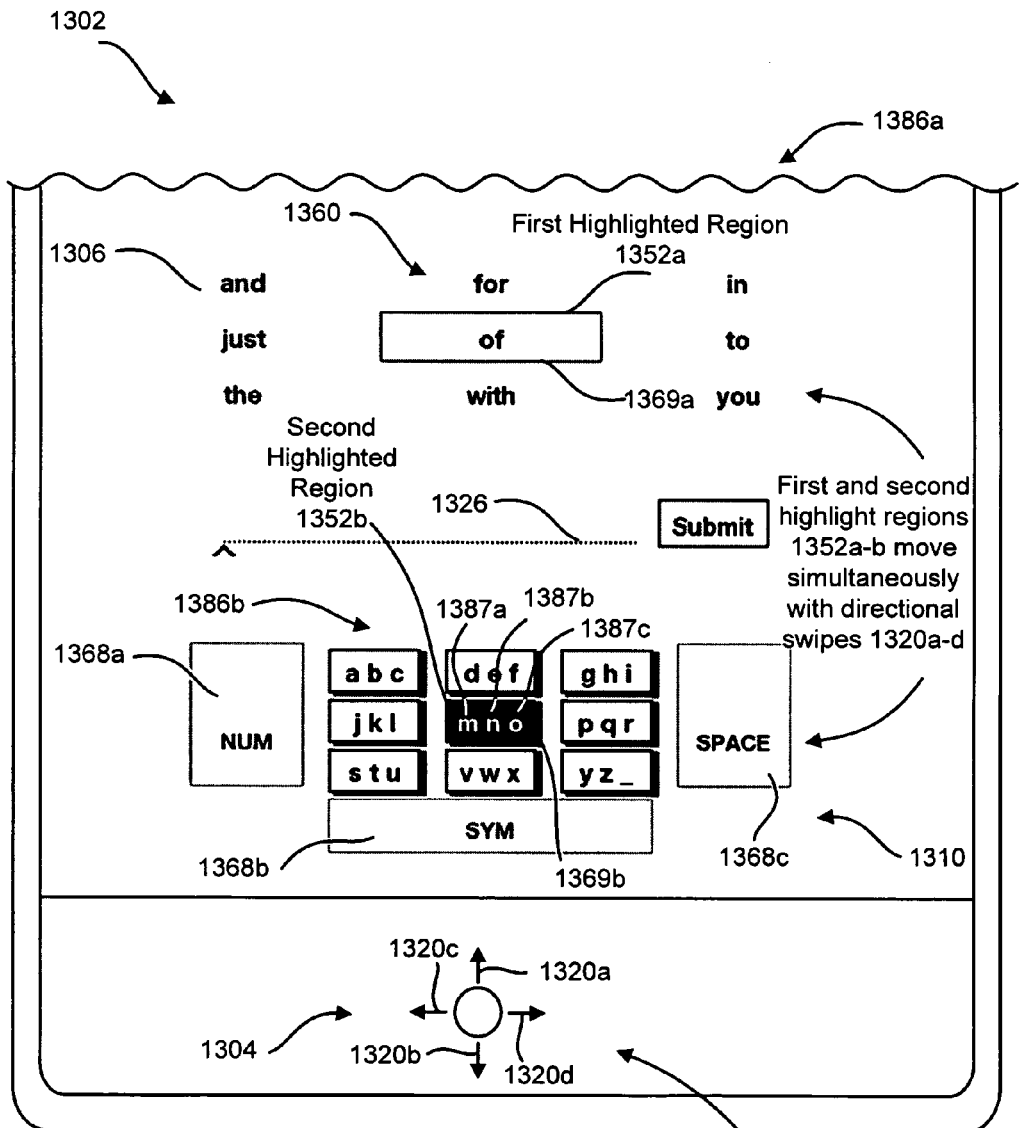
FIG. 13 illustrates another embodiment of specifying textual input using a multi-directional input device including a matrix of predictive text and a matrix of groups of characters.

FIG. 13 illustrates yet another alternative embodiment of a system 1302 for inputting text utilizing a multi-directional input device 1304. This embodiment includes a matrix 1386*a* of predictive text 1360 and a matrix 1386*b* of characters 1310 in groups of three. A first highlighted region 1352*a* moves within the matrix 1386*a* of predictive text 1360, and second highlighted 1352*b* region moves simultaneously in the same direction within the matrix 1386*b* of characters 1310 in response to directional swipes 1320*a-d* received via the directional input device 1304.

In one embodiment, when a group of characters 1310 is highlighted within the matrix 1386*b* of characters 1310, a single click inputs the first letter 1387*a* in the group of three into the text submission area 1326. Two clicks in rapid succession sends the second letter 1387*b* within the highlighted group of characters 1310 to the text submission area 1326, and three rapid clicks sends the third letter 1387*c* within the highlighted group of characters to the text submission area 1326. Holding down the clicking mechanism for a period of time will send the predictive text 1360 that is highlighted to the text submission area 1326. Directional swipes 1320*a-d* or combinations of directional swipes 1320*a-d* may also be used to select and place characters 1387*a-c* or predictive text 1360 to the text submission area 1326 within the scope of the disclosed systems 1302 and methods.

In one embodiment, a "home" key concept is utilized such that after a character 1310, predictive text 1360, num key 1368*a*, sym key 1368*b* or space 1368*c* is sent to the text submission area 1326, the first and second highlighted regions 1352*a-b* move to the center predictive word 1369*a* of characters or the center group 1369*b* 1369, respectively. In the illustrated embodiment, the center predictive word 1369*a* is the word "of" and the center group 1369*b* is the "mno" group.

The system depicted in FIG. 13 may also include other controls such as a number control indicator 1368*a* for displaying and inputting numbers, a symbol control indicator 1368*b* for displaying and inputting symbols, and a space control indicator 1368*c* for inputting a space into the text submission area 1326. These indicators 1368*a-c* may be accessed and controlled using, for example, directional swipes 1320*a-d*.

Figure 14:
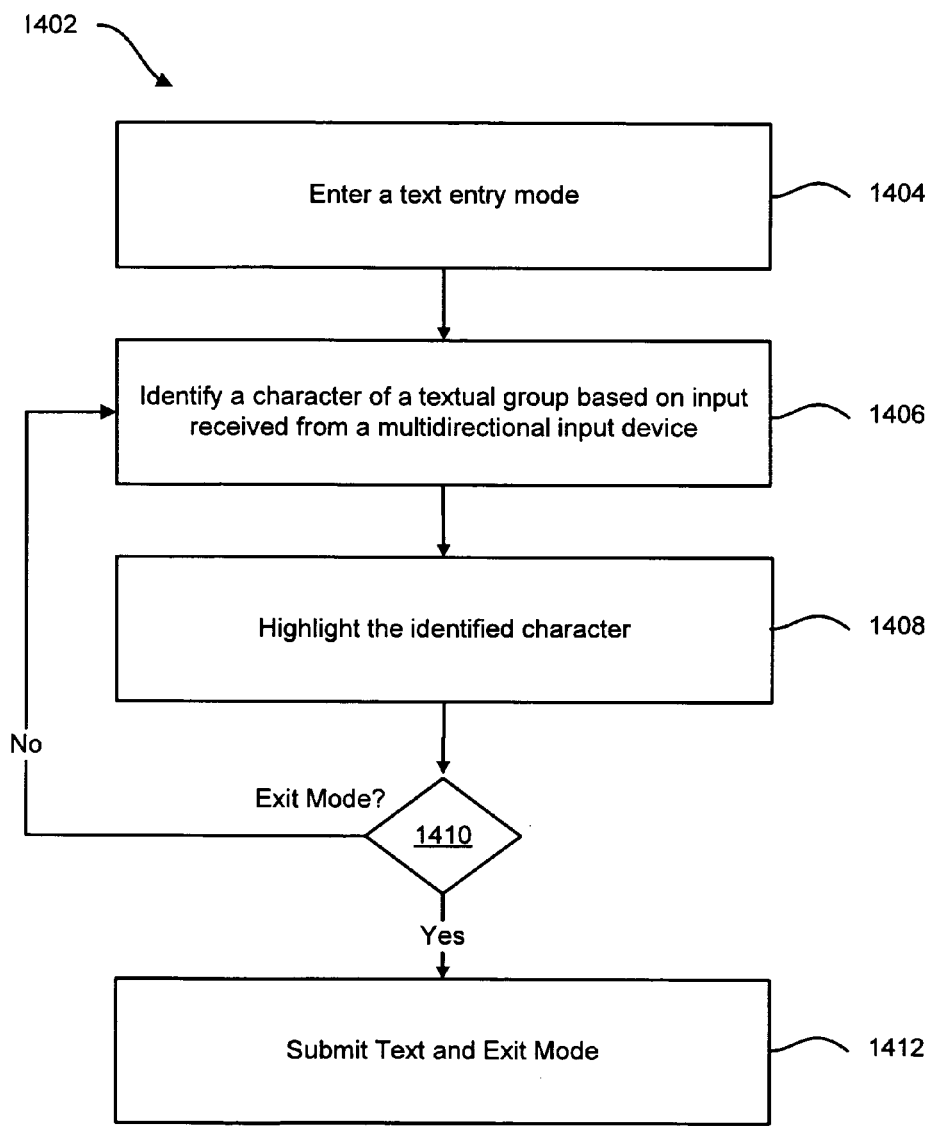
FIG. 14 illustrates one embodiment of a method for specifying textual input utilizing a multi-directional input device.

FIG. 14 is a flow diagram illustrating one embodiment of a method 1402 for specifying textual input using a multi-directional input device 1304. The device 1306 enters 1404 a text entry mode. The text entry mode may be entered 1404 in a number of different ways, such as by clicking within a text submission area 1326, selecting a hardware or software button or control, or in response to one or more specified directional swipes 1320.

Thereafter, a character 1310 may be identified 1406 based on input received from a multi-directional input device 1304. This may occur in a number of different ways. For example, a directional swipe 520 may indicate an angle 514 associated with a character 510 displayed on the display screen 508. Alternatively, a directional swipe 1320*a-d* may identify a character 1310, or group of characters 1310, at a position relative to a current highlighted region 1352*a-b*.

The character(s) 1310 identified by the directional swipe 1320 may then be highlighted 1408. Highlighting 1408 may comprise placing visual indicia 522 on or near the highlighted character(s) 1224. In one such embodiment, after visual indicia 522 is placed on or near the highlighted character 1224, the highlighted character 1224 may be sent to the text submission area 1326 in response, for example, to clicking the multi-directional input device 1304, directional swipes 1320, or activation of a hardware or software based button, control, or icon. Alternatively, in one embodiment, highlighting 1408 the identified character 1310 comprises sending the identified character 1310 to the text submission area 1326.

Thereafter, it is determined 1410 whether to exit the text entry mode. If the text entry mode is exited, the characters 530 displayed in the text submission area 1326 are sent to a computer program 134 running on the device 1306. If the text entry mode is not exited, then the computing device 1306 may await input of additional characters 1310 using the multi-directional point device 1304.

As explained above, the text entry mode may be exited in various ways, including, for example, using a directional swipe 1320, a combination of directional swipes 1320, or by activating a particular software or hardware button, control, or icon on the device 1306. In one embodiment, activating the submit button 1328 sends text to the text submission area 1326 into a computer program 134 and also exits 1412 the text entry mode.

Figure 15:
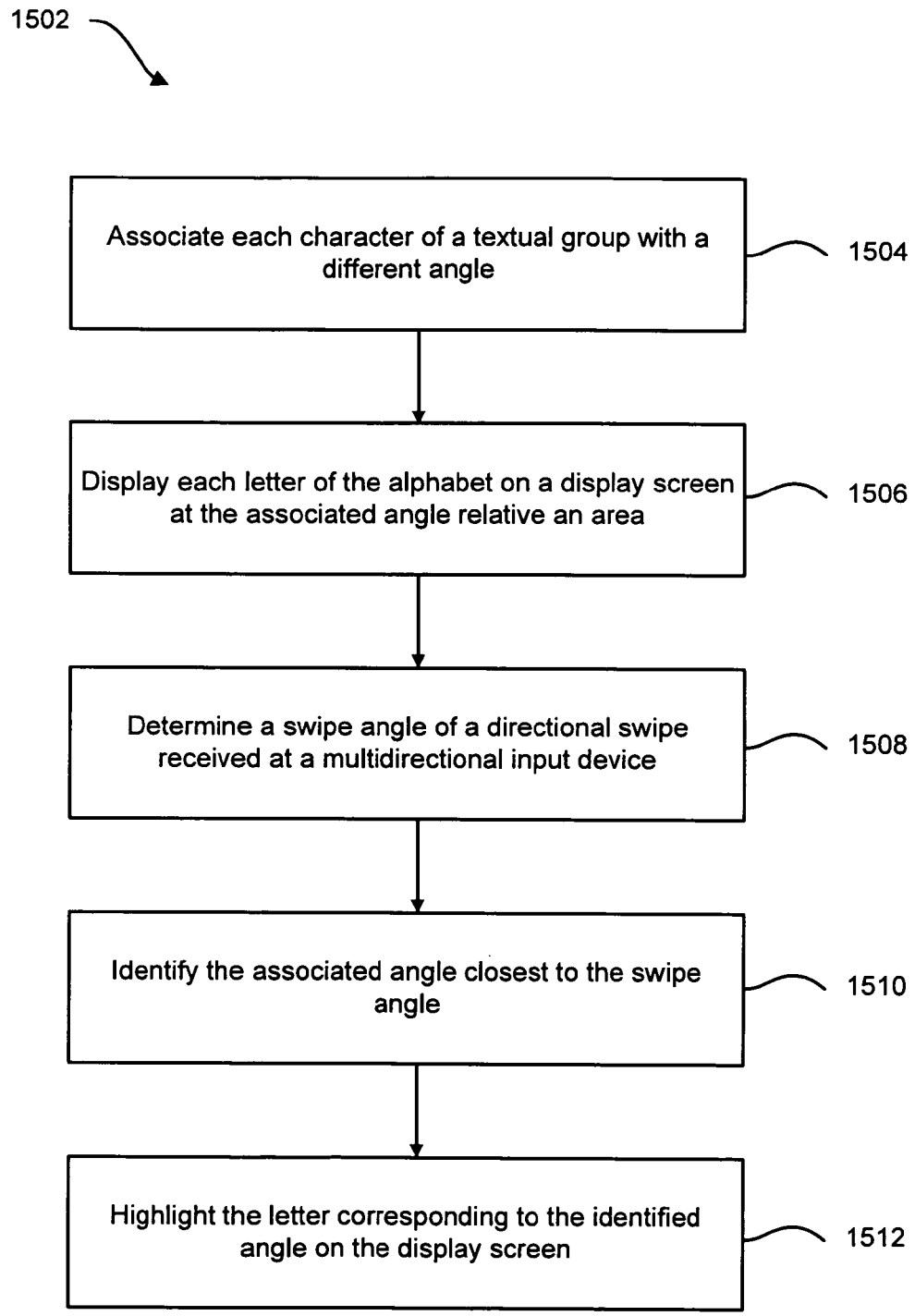
FIG. 15 illustrates another embodiment of a method for specifying textual input utilizing a multi-directional input device.

FIG. 15 is a flow diagram illustrating another embodiment of a method 1502 for specifying textual input for a device 506 using a multi-directional input device 1304. Although not illustrated in FIG. 15, the disclosed embodiment may involve entering 1404 and exiting 1412 a text entry mode, as explained in FIG. 14.

In the method 1502 illustrated in FIG. 15, each character 1310 of a textual group 512 is associated 1504 with a different angle 414. Characters 1310 within a textual group 512 may comprise a specific group of letters of an alphabet, numbers, and/or symbols.

Each character 1310 of the textual group 512 is displayed 1506 on a display screen 508 at the associated angle 514 relative to an area 516. This may occur for example, by displaying 1506 the characters 1310 both above, below, and/or to the side of a specified area 516. The specified area 516 may comprise a text submission area 1326, in which specified characters 1310 are displayed.

A swipe angle 518 of a directional swipe 520 received at the multi-directional input device 1304 is determined 1508. The associated angle 514 closest to the swipe angle is identified 1510.

The character 1310 corresponding to the identified angle 514 is highlighted 1512 on the display screen 508. Highlighting 1512 may comprise positioning visual indicia 522 on, around, or near the highlighted character 1224. Alternatively, highlighting 1512 could comprise positioning the highlighted character 1224 in a text submission area 1326. This process may repeat until all textual input has been entered and/or until the device exits the text entry mode.

Figure 16:
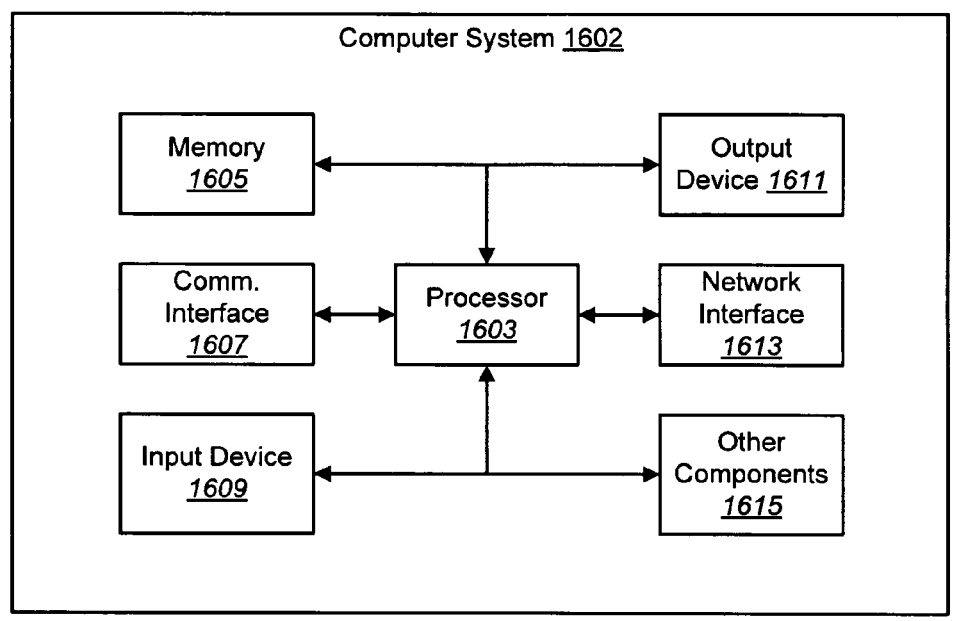
FIG. 16 illustrates various components that may be utilized in a computing device.

FIG. 16 illustrates various components that may be utilized in a computing device 1602. One or more computing devices 1602 may be used to implement the various systems and methods disclosed herein. The computing device 1602 may comprise, for example, an electronic-book reader, a portable phone, a tablet PC, a personal data assistant (PDA), a desktop computer, or laptop computer, microcontrollers, hand-held computers, personal computers, servers, mainframes, supercomputers, minicomputers, workstations, and any variation or related device thereof. The illustrated components may be located within the same physical structure or in separate housings or structures.

The computing device 1602 is shown with a processor 1603 and memory 1605. The processor 1603 may control the operation of the computing device 1602 and may be embodied as a microprocessor, a microcontroller, a digital signal processor (DSP) or other device known in the art. The processor 1603 typically performs logical and arithmetic operations based on program instructions stored within the memory 1605. The instructions in the memory 1605 may be executable to implement the methods described herein.

The computing device 1602 may also include one or more communication interfaces 1607 and/or network interfaces 1613 for communicating with other electronic devices. The communication interface(s) 1607 and the network interface(s) 1613 may be based on wired communication technology, wireless communication technology, or both.

The computing device 1602 may also include one or more input devices 1609 and one or more output devices 1611. The input devices 1609 and output devices 1611 may facilitate user input. Other components 1615 may also be provided as part of the computing device 1602.

FIG. 16 illustrates only one possible configuration of a computing device 1602. Various other architectures and components may be utilized.

Figure 17:
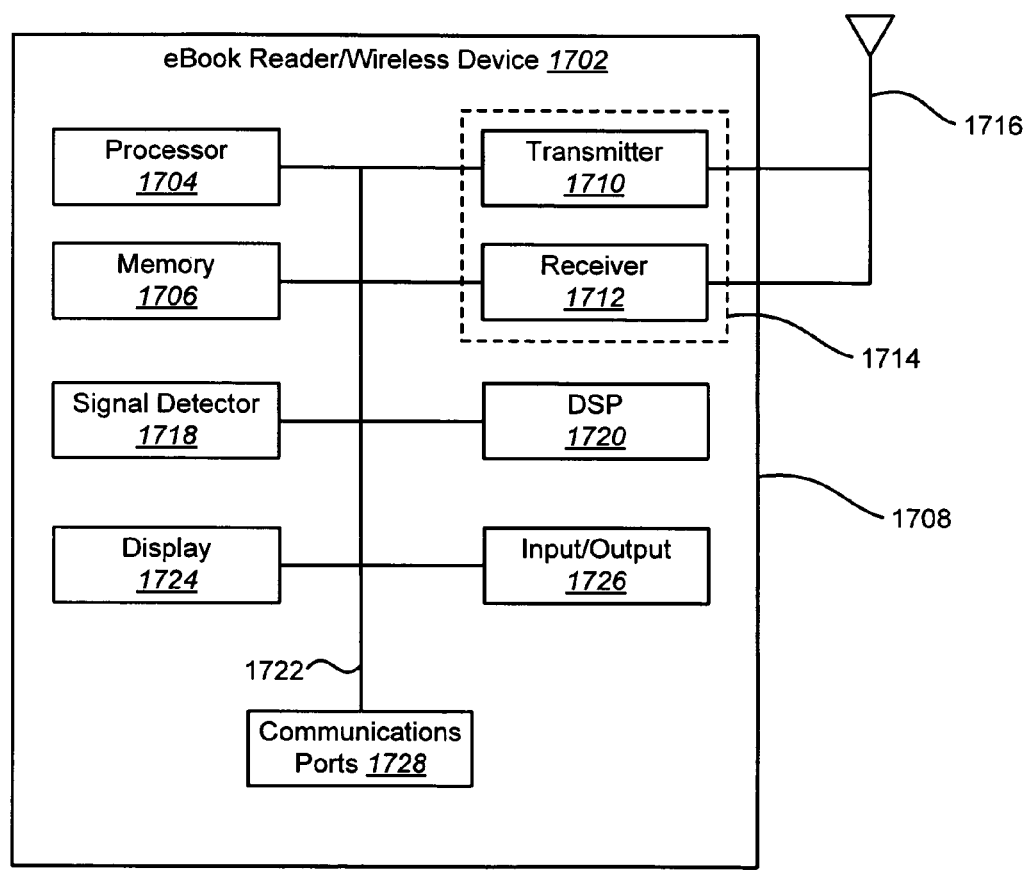
FIG. 17 illustrates various components that may be utilized in an eBook reader/wireless device, which is one type of computing device.

FIG. 17 illustrates various components that may be utilized in an eBook reader/wireless device 1702. An eBook reader/wireless device 1702 is one type of computing device 1602 that may be used with or used to implement the systems and methods disclosed herein. An eBook reader 1702 functions as the electronic counterpart of a paper-based book. The user may hold the eBook reader 1702 in a manner similar to a physical book; the user may electronically turn the pages of the book, and so on. An eBook reader 1702 is used to view eBooks. An eBook may refer to a book in electronic form or to one or more portions of a book (such as a chapter of a book) or to a compilation of multiple books (such as a book series), and so on. An eBook reader 1702 may be used to view any kind of digital content including, but not limited to, eBooks, web pages, blogs, electronic newspapers, electronic magazines, etc. An eBook reader 1702 is also specifically designed to function as an eBook reader. As a result, desktop computers and laptop computers are not considered to be eBook readers 1702 as the term eBook reader is used herein.

The eBook reader/wireless device 1702 may include a processor 1704 which controls operation of the wireless device 1702. The processor 1704 may also be referred to as a central processing unit (CPU). Memory 1706, which may include both read-only memory (ROM) and random access memory (RAM), provides instructions and data to the processor 1704. A portion of the memory 1706 may also include non-volatile random access memory (NVRAM). The processor 1704 typically performs logical and arithmetic operations based on program instructions stored within the memory 1706. The instructions in the memory 1706 may be executable to implement the methods described herein.

The device 1702 may also include a housing 1708 that may include a transmitter 1710 and a receiver 1712 to allow transmission and reception of data between the wireless device 1702 and a remote location. The transmitter 1710 and receiver 1712 may be combined into a transceiver 1714. An antenna 1716 may be attached to the housing 1708 and electrically coupled to the transceiver 1714. The device 1702 may also include (not shown) multiple transmitters, multiple receivers, multiple transceivers and/or multiple antenna.

The device 1702 may also include a signal detector 1718 that may be used to detect and quantify the level of signals received by the transceiver 1714. The signal detector 1718 may detect such signals as total energy, pilot energy per pseudonoise (PN) chips, power spectral density, and other signals. The wireless device 1702 may also include a digital signal processor (DSP) 1720 for use in processing signals.

The device 1702 may also include one or more communication ports 1728. Such communication ports 1728 may allow direct wired connections to be easily made with the device 1702.

Additionally, input/output components 1726 may be included with the device 1702 for various input and output to and from the device 1702. Examples of different kinds of input components include a keyboard, keypad, mouse, microphone, remote control device, buttons, joystick, trackball, touchpad, lightpen, etc. Examples of different kinds of output components include a speaker, printer, etc. One specific type of output component is a display 1724.

The various components of the wireless device 1702 may be coupled together by a bus system 1722 which may include a power bus, a control signal bus, and a status signal bus in addition to a data bus. However, for the sake of simplicity, the various busses are illustrated in FIG. 17 as the bus system 1722.

As used herein, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The steps of a method or algorithm described herein may be embodied in a software module executed by a processor, in firmware, in hardware, or in a combination thereof. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

If the methods described herein are implemented in software, the software may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), high definition DVD, floppy disk and Blu-ray® disc.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
    displaying a first matrix comprising a plurality of rows and a plurality of columns of predictive text;
    displaying a second matrix comprising a plurality of rows and a plurality of columns of characters that are organized into groups of characters;
    determining a swipe angle of a directional swipe received at a multi-directional pointing device;
    identifying the associated angle closest to the swipe angle;
    moving a first highlighted region in a direction within the first matrix to highlight first predicted text, the direction corresponding to the identified angle;
    substantially simultaneously with moving the first highlighted region, moving a second highlighted region in the direction within the second matrix to highlight a first group of characters of the groups of characters;
    in response to determining that the first predicted text is selected, sending the first predictive text to a text submission area;
    in response to sending the first predictive text to the text submission area:
        move the first highlighted region to a centered predicted text of the plurality of predicted text; and
        move the second highlighted region to a centered group of characters of the groups of characters while moving the first highlighted region to the centered predicted text.

2. The method of claim 1, wherein the first highlighted region displays visual indicia on the display screen to distinguish the first predicted text from other predicted text.

3. The method of claim 1, wherein the second highlighted region displays visual indicia on the display screen to distinguish the first group of characters from other groups of characters.

4. The method of claim 1, further comprising determining a swipe magnitude of the directional swipe received at the multi-directional input device, and wherein the first highlighted region and the second highlighted region are simultaneously moved in the direction an amount that corresponds to the swipe magnitude.

5. The method of claim 1, wherein the groups of characters include letters of an alphabet.

6. The method of claim 1, wherein the groups of characters include letters of an alphabet and numbers.

7. The method of claim 1, wherein the groups of characters include letters of an alphabet, numbers and symbols.

8. The method of claim 1, wherein the display screen comprises a text submission area.

9. The method of claim 1, further comprising:
selecting a first letter of the first group of characters within the second matrix in response to one click of the multi-directional input device,
selecting a second letter of the first group of characters within the second matrix in response to two clicks of the multi-directional input device,
selecting a third letter of the first group of characters within the second matrix in response to three clicks of the multi-directional input device, and
selecting the first predicted text within the first matrix in response to a hold-click of the multi-directional input device.

10. The method of claim 1, wherein the predictive text in the first highlighted region is sent to a computer program in response to activation of a submit button.

11. An apparatus comprising:
a processor;
a multi-directional input device in electronic communication with the processor;
a display screen in electronic communication with the processor; and
memory in electronic communication with the processor, the memory comprising instructions executable by the processor to:
display a first matrix comprising a plurality of rows and a plurality of columns of predicted text;
display a second matrix comprising a plurality of rows and a plurality of columns that include groups of characters;
determine a swipe angle of a directional swipe received at the multi-directional input device;
identify the associated angle closest to the swipe angle;
move a first highlighted region in a direction within the first matrix to highlight a first predicted text from the plurality of predicted text, the direction based on the identified angle; and
move a second highlighted region in the direction within the second matrix to highlight a first group of characters from the groups of characters, the second highlighted region being moved substantially contemporaneously with the first highlighted region;
in response to determining that the first predicted text is selected, sending the first predictive text to a text submission area;
in response to sending the first predictive text to the text submission area:
move the first highlighted region to a centered predicted text of the plurality of predicted text; and
move the second highlighted region to a centered group of characters of the groups of characters while moving the first highlighted region to the centered predicted text.

12. The apparatus of claim 11, wherein the first highlighted region displays visual indicia on the display screen to distinguish the first predicted text from other predicted text.

13. The apparatus of claim 11, wherein the second highlighted region displays visual indicia on the display screen to distinguish the first group of characters from other groups of characters.

14. The apparatus of claim 11, wherein the instructions are further executable to determine a swipe magnitude of the directional swipe received at the multi-directional input device, and to move the first highlighted region and the second highlighted region substantially simultaneously in the direction the swipe an amount that is based on the swipe magnitude.

15. The apparatus of claim 11, wherein the groups of characters include at least one of letters of an alphabet, numbers, or symbols.

16. The apparatus of claim 11, wherein the multi-directional input device comprises a trackball.

17. The apparatus of claim 11, wherein the multi-directional input device comprises a 5-way input device.

18. The apparatus of claim 11, wherein the apparatus is an eBook reader.

19. The apparatus of claim 11, wherein the instructions are further executable by the processor to:
select a first letter of the first group of characters within the second matrix in response to receiving one click of the multi-directional input device,
select a second letter of the first group of characters within the second matrix in response to receiving two clicks of the multi-directional input device,
select a third letter of the first group of characters within the second matrix in response to receiving three clicks of the multi-directional input device, and
select the first predicted text within the first matrix in response to receiving a hold-click of the multi-directional input device.

20. A computer-readable medium comprising instructions executable to specify textual input for a computing device using a multi-directional input device, the instructions being executable to:
display a first matrix comprising a plurality of rows and a plurality of columns of predicted text;
display a second matrix comprising a plurality of rows and a plurality of columns that include groups of characters;
determine a swipe angle of a directional swipe received at a multi-directional input device;
identify the associated angle closest to the swipe angle;
move a first highlighted region within the first matrix to highlight a first predicted text from the plurality of predicted text, the first highlighted region moving in a direction of the associated angle;
while moving the first highlighted region, move a second highlighted region within the second matrix to highlight a first group of characters from the groups of characters, the second highlighted region moving in the direction of the associated angle;
in response to determining that the first predicted text is selected, sending the first predictive text to a text submission area;
in response to sending the first predictive text to the text submission area:
move the first highlighted region to a centered predicted text of the plurality of predicted text; and
move the second highlighted region to a centered group of characters of the groups of characters while moving the first highlighted region to the centered predicted text.

21. The computer-readable medium of claim 20, wherein the first highlighted region displays visual indicia on the display screen to distinguish the first predicted text from other predicted text.

22. The computer-readable medium of claim 20, wherein the second highlighted region displays visual indicia on the display screen to distinguish the first group of characters from other groups of characters.

23. The computer-readable medium of claim 20, wherein the instructions are further executable to determine a swipe magnitude of the directional swipe received at the multi-directional input device, the first highlighted region and the second highlighted region being moved in the direction an amount that corresponds to the swipe magnitude.

24. The computer-readable medium of claim 20, wherein each group of the groups of characters comprises at least one of a letter of an alphabet, a number, or a symbol.

25. The computer-readable medium of claim 20, wherein, when a group of characters in the second matrix is highlighted:
- a single click inputs a first letter from the first matrix to a text submission area;
- two clicks input a second letter from the first matrix to the text submission area; and
- three clicks input a third letter from the first matrix to the text submission area.

\* \* \* \* \*